Figures 1, 2, 3:
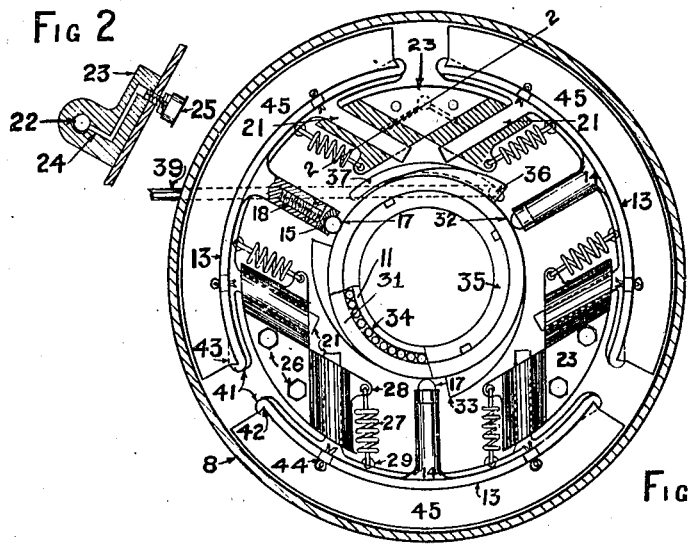

T. R. MORSE.
INTERNAL EXPANSION BRAKE.
APPLICATION FILED NOV. 15, 1917.

1,292,849.

Patented Jan. 28, 1919.

INVENTOR;
Thomas Ray Morse

ATTY.

United States Patent Office.

THOMAS ROY MORSE, OF BEXLEY, NEAR SYDNEY, NEW SOUTH WALES, AUSTRALIA.

INTERNAL EXPANSION-BRAKE.

1,292,849.   Specification of Letters Patent.   Patented Jan. 28, 1919.

Application filed November 15, 1917. Serial No. 202,179.

*To all whom it may concern:*

Be it known that I, THOMAS ROY MORSE, a subject of the King of Great Britain, residing at "Esrom," Harrow Road, Bexley, near Sydney, in the State of New South Wales and Commonwealth of Australia, licensed surveyor, have invented new and useful Improvements in Internal Expansion-Brakes, of which the following is a specification.

This invention relates to brakes wherein an inner expansible stationary element is adapted to be forced in its expansion against a flange or drum on the revolving element and it has been devised in order to the construction of a more effective brake of such kind.

Figure 1 is an elevation partly in section of a brake according to this invention removed from the revolving element but showing the brake drum in section Fig. 2 being a sectional view on the line 2—2 in Fig. 1 of the stationary guide brackets while Fig. 3 is a simplified central sectional elevation of the whole.

In this construction of brake the revolving element fast on the shaft 4 is a wheel 5 whose boss 6 has a disk 7 terminating in the flange 8 which is the brake drum. The wheel axle casing 9 which of course is stationary has a journal bearing 10 for the shaft 4 and has an abutment boss 11 as well as a disk or cover plate 12 to close over the internal space of the drum 8.

Within the drum 8 are three sector-rings or brake-block holders 13 each having a radial medial stem 14 within its inner end a cup 15 for a bearing ball 17 said cup 15 being on the end of a shank 18 adapted to be adjustably screwed into said stem 14 and to be locked by a cotter pin in one or other orifices to provide for extension as the brake block wears.

Toward each end of each sector-rim 13 are stems or plungers 21 set axially parallel with the medial stem 14 each of which is slidably inclosed in a bore 22 forming a bearing therefor in guide bracket 23. In each bracket 23 are grease ducts 24 from a lubricator 25 exteriorly of the stationary cover plate 12 to which said brackets 23 are affixed say by bolts 26. Draw springs 27 are hooked to lugs 28 of stationary brackets 23 and to eyes 29 of the sector rims 13.

The abutment boss 11 has slidably around it the pressure ring 31 having exteriorly three eccentric cams or rams each reaching from 32 to 33 and one of which is under a medial stem 14 of a sector-rim 13. This ring 31 is preferably on two sets of ball bearings 34 retained in position by a shoulder of the boss 11 and by jamb nuts 35. A pin or stud 36 from the pressure ring 31 extrudes through a sector slot 37 in the cover plate 12 whose ends form the stops to the rotation of said ring 31 and clear of the webs 38 of said cover plate 12 this pin 36 is jointed to a pull rod 39 leading to an appropriate control gear or handle.

Each sector-rim 13 has hook or overhanging ends 41 with dovetail or undercut internal faces 42 and with flush flanges or stops 43 on one face of the rim and lugs on the opposite face thereof for cotter pins 44 to retain the brake blocks 45 in place after they have been slid transversely within the dovetail ends 42.

While the shaft 4 and wheel 5 is free to revolve the springs 27 pull the sector-rims 13 with blocks 45 just clear of the internal periphery of the brake drum 8 with the ball 17 pressing on the leading ends 32 of the respective cams of pressure ring 31.

To apply the brake the pull rod 39 is actuated and it part revolves the pressure ring 31 so that under each ball 17 a cam passes forwardly from 32 as a wedge thrusting its sector-rim 13 radially outwardly and causing the blocks 45 to grip the drum 8 as a complete arc guided by the plungers 21 in the stationary brackets 23. The rod 39 may be pulled as quickly or as slowly as well as more or less strongly as desired for the necessary force to suddenly or to gradually apply the brake the full arc grip of the blocks 45 being insured by the true radial thrust upon the sector-rims 13. The movement of the pressure ring 31 is reversed to release the brake the springs 27 drawing the blocks 45 to normal position free of the drum.

What I claim is:—

1. A brake comprising a shaft, a drum fixed to said shaft, a stationary boss surrounding said shaft, a plate secured to said boss, sector-rims biased toward said shaft, guides secured to said plate, plungers formed on said rims and slidable in said guides, said plungers being disposed tangentially of said shaft, a ring loosely mounted on said boss, longitudinally adjustable stems formed on said rims and contacting with said ring, shoes carried by said rims, cams formed on said ring and engageable with said stems, and means for rotating said ring.

2. A brake comprising a shaft, a drum fixed to said shaft, a stationary boss surrounding said shaft, a plate secured to said boss, sector-rims biased toward said shaft, guides secured to said plate, plungers formed on said rims and slidable in said guides, said plungers being disposed tangentially of said shaft, a ring loosely mounted on said boss, ball-bearings interposed between said ring and boss, cams formed on said ring and adapted to engage said plungers, and means for rotating said ring.

3. A brake comprising a shaft, a drum fixed to the shaft, a stationary boss surrounding said shaft, a plate secured to said boss, sector-rims movable radially within said drum, plungers formed on said sector-rims, guides formed on said plate and slidingly receiving said plungers, springs connecting said guides and sector-rims to normally maintain the latter in retracted position, extensible stems formed on the sector-rims, a ring rotatable on said boss, cams formed on the ring and adapted to engage said stems, and means for rotating said ring.

4. A brake comprising a shaft, a drum fixed to said shaft, a stationary boss surrounding said shaft, a plate secured to said boss, sector-rims biased toward said shaft, guides secured to said plate, plungers formed on each of said rims and slidable in said guides, said plungers being disposed tangentially of said shaft, a ring loosely mounted on said boss, ball bearings interposed between said ring and boss, adjustable stems formed on said rims and contacting with said ring, shoes carried by said rims, cams formed on said ring and engageable with said stems, and means for rotating said ring.

5. A brake as embodied in claim 1, and means for lubricating said plungers.

6. A brake comprising a shaft, a drum fixed to said shaft, a stationary boss surrounding said shaft, a plate secured to said boss, sector-rims biased toward said shaft, guides secured to said plate, bearings formed on said rims and movable in said guides, a ring loosely mounted on said boss, longitudinally adjustable stems formed on said rims and contacting with said ring, cams formed on said ring and engageable with said stems, and means for rotating said ring.

In testimony whereof I have signed my name to this specification in the presence of two subscribing witnesses.

THOMAS ROY MORSE.

Witnesses:
PERCY NEWELL,
I. EASTON.